United States Patent [19]

Meyer et al.

[11] 4,321,336

[45] Mar. 23, 1982

[54] HIGH IMPACT POLYAMIDE BLENDS

[75] Inventors: Rolf-Volker Meyer; Rolf Dhein; Friedrich Fahnler, all of Krefeld, Fed. Rep. of Germany

[73] Assignee: Bayer Aktiengesellschaft, Leverkusen, Fed. Rep. of Germany

[21] Appl. No.: 122,524

[22] Filed: Feb. 19, 1980

Related U.S. Application Data

[63] Continuation of Ser. No. 928,593, Jul. 27, 1978, abandoned.

[30] Foreign Application Priority Data

Aug. 2, 1977 [DE] Fed. Rep. of Germany ....... 2734693

[51] Int. Cl.³ ...................... C08L 23/06; C08L 23/08; C08L 77/00; C08L 83/04
[52] U.S. Cl. .................................. 525/183; 525/419; 525/420; 525/431; 525/184
[58] Field of Search .............. 525/183, 184, 431, 419, 525/420

[56] References Cited

U.S. PATENT DOCUMENTS

| | | |
|---|---|---|
| 3,646,157 | 2/1972 | Grosjean et al. |
| 3,668,274 | 6/1972 | Owens et al. |
| 3,796,771 | 3/1974 | Owens et al. |
| 4,086,295 | 4/1978 | Mori et al. ........................ 525/183 |
| 4,105,709 | 8/1978 | Iwami et al. |
| 4,246,371 | 1/1981 | Meyer et al. ...................... 525/183 |

FOREIGN PATENT DOCUMENTS

| | | |
|---|---|---|
| 740501 | 8/1966 | Canada . |
| 42-11697 | 7/1967 | Japan . |
| 7002353 | 8/1970 | Netherlands ...................... 525/183 |
| 1241361 | 8/1971 | United Kingdom ................ 525/183 |

*Primary Examiner*—Allan Lieberman
*Attorney, Agent, or Firm*—Connolly and Hutz

[57] ABSTRACT

High impact polyamide blends consisting of polyamides having a relative viscosity of at least 3, 5 and of at least one polymer taken from the group comprising aliphatic polyolefines, olefinic copolymers of aliphatic monoolefines, (meth)acrylic acid or (meth)acrylic acid esters, copolymers of styrene, (meth)acrylic acid and (meth)acrylic esters, copolymers of aliphatic dienes and acrylonitrile and high molecular weight organic silicon compounds.

13 Claims, No Drawings

HIGH IMPACT POLYAMIDE BLENDS

CROSS REFERENCE TO RELATED APPLICATION

This application is a continuation of application Ser. No. 928,593, filed July 27, 1978, and now abandoned.

This invention relates to high impact polymeric blends based on polyamide-6, which has a relative viscosity of at least 3.5 or a K-value of at least 83, according to Fikentscher.

The impact strength of moulded products made of polyamide resins depends to a considerable extent on their water content. In the anhydrous state, for example, just after their manufacture by injection moulding, products produced from highly fluid polyamide moulding compounds of medium molecular weight, and especially those produced from highly crystalline polyamides, are relatively sensitive to impact. There is therefore a demand for easily flowing polyamide resins which can be quickly processed and from which it is also possible to manufacture moulded products which have a sufficient high impact strength when dried. Therefore polyamides which have a high tensile strength, a high heat distortion temperature, high resistance to solvents, a high impact strength and flexibility and which can be processed easily are of particular interest.

Various processes for increasing the toughness and flexibility of polyamides are already known. Thus, for example, the addition of low molecular weight plasticizers to polyamides is known, but for various reasons, this is not a satisfactory solution of the problem. The majority of plasticizers which are suitable for synthetic resins are not sufficiently compatible with polyamides and tend to separate, by processing the polyamide compound. On the other hand, compatible plasticizers which form true solutions with polyamides in most cases impair the desirable mechanical properties of polyamides. Highly polar substances of low molecular weight, such as water or dimethyl formamide, have an efficient plasticizer effect. But they can only be incorporated into polyamides after the compounds have been manufactured into moulded articles, because a polyamide granulate which has been pre-treated with such a plasticizer would form bubbles when processed into a moulded product, on account of the relatively low boiling points of these plasticizers.

Moreover, this method is generally time consuming and costly and it is unsuitable for the manufacture of thick walled moulded products, because of the irregular distribution of the plasticizer.

In addition, these plasticizers partly evaporate from the polyamide owing to their relatively high vapour pressure.

Other processes are known in which the impact strength of polyamides is improved by the addition of polymers. Polyethylenes and copolymers of vinyl acetate and ethylene, for example, have been used with moderate success for this purpose.

The preparation of such mixtures requires highly intensive kneading and even then the components tend to separate again when the mixture is subsequently processed, for example, by injection moulding. Moulded products show white fractures under stress. According to another process, the flexibility of polyamides is increased by the addition of polyethylenes which contain acid groups, e.g. copolymers of ethylene and unsaturated acids or polyethylene which has been grafted with unsaturated acids. Although such mixtures are more finely dispersed and show much less white fracture under stress than the mixtures described above, it is found that apart from a slight improvement in the toughness and flexibility the mechanical properties, e.g. the elastic modulus, tensile strength, hardness and rigidity are considerably inferior to those of unmixed polyamide moulding compounds.

It is also known to blend polyamides with copolymers of ethylene and esters of (meth) acrylic acid with tertiary alcohols. Although these blends are homogeneous and can usually be processed without difficulties, the notched impact strengths measured on freshly injection moulded samples are only from 10-12 kJ/m$^2$ and therefore virtually no better than those measured on products described in the known art.

It has now surprisingly been found that polyamide blends which have an exceptionally high notched impact strength in the freshly extruded state are obtained when polyamides, in particular 6-polyamides, which have a relative viscosity of at least 3.5, (determined on a 1% solution of the polymer in m-cresol at 25° C.) are used.

This improvement in the notched impact strength obtained by using high molecular weight polyamides was completely unexpected since the commercial polyamides alone show virtually only little difference in the notched impact strength of freshly extruded products with increasing molecular weight. Moreover, the more highly viscous polyamides are the more difficult to process.

The present invention therefore relates to polyamide blends which have a high impact strength in the freshly extruded—that is the anhydrous—state, consisting of:

(1) from 60 to 95% by weight, preferably from 70 to 90% by weight of a polyamide having a relative viscosity of at least 3.5 and (2) from 5 to 40% by weight, preferably from 10 to 30% by weight of at least one other polymer selected from the group consisting of
  (a) aliphatic polyolefines
  (b) olefinic polymers composed of
    (i) from 65 to 98% by weight, preferably from 75 to 95% by weight of an aliphatic $C_2$ to $C_4$ monoolefine and
    (ii) from 35 to 2% by weight, preferably from 25 to 5% by weight of (meth) acrylic acid or (meth) acrylic acid esters,
  (c) copolymers of
    (I) from 50 to 70% by weight of styrene,
    (II) from 5 to 15% by weight of (meth) acrylic acid and
    (III) from 20 to 30% by weight of (meth) acrylic acid esters with $C_4$ to $C_{10}$
  (d) polymers of from 70 to 100% by weight of $C_4$-$C_5$ aliphatic dienes and from 0 to 30% by weight of acrylonitrile and
  (e) high molecular weight organic silicon compounds, with the proviso that the sum of (1)+(2) is equal to 100% by weight of the claimed high impact polyamide blend, that the sum of (i)+(ii) is equal to 100% by weight of (b), that the sum of (I) to (III) is equal to 100% by weight of (c), that the sum of (a) to (e) is equal to 100% by weight of (2) and that component 2a is invariably used with either component 2b or 2c. Preferred blends contain, in addition to the polyamide a mixture of 99.9%–75% preferably 80–90%, by weight of components 2a and 0.1–25% preferably 10–20% by weight of 2c or only component 2b alone.

The polyamide used is preferably a 6-polyamide which has a relative viscosity of at least 3.5. It is surprisingly found that if the above mentioned hydrophobic and apolar blend constituents 2 are used in combination with 6-polyamides which have a relative viscosity of at least 3.5, preferably at least 3.8, an outstanding improvement of the notched impact strength is achieved which is comparable with that of water conditioned blends based on 6-polyamides which have the usual relative viscosity of ca. 3.0.

According to the invention, the notched impact strength can generally be doubled by using a high molecular weight 6-polyamide instead of a 6-polyamide of the usual viscosity.

In order to obtain a similar increase in the notched impact strength when using the common used 6-polyamide, one would have to use at least twice the quantity of blend-constituents, which would generally impair the homogeneity as well as considerably reduce the flexural strength.

The substances used as polymer component 2a are preferably polymers of aliphatic monoolefines with 2 to 4 carbon atoms such as polyethylenes or polyethylene-/polypropylene copolymers, preferably with melt indices within the range of from 5 to 20 cm/10 min (190° C.).

The substances used as polymer component 2b are preferably copolymers of ethylene and (meth) acrylic acid or of ethylene and (meth) acrylic esters which have from 2 to 10, preferably 2 to 7 carbon atoms in the alcohol residue, preferably n-butyl or tertiary-butyl esters. The melt indices of the copolymer are preferably in the range of from 2 to 10 cm/10 min. at 190° C. (Meth) acrylic acid may be partly or completely in the form of a salt, preferably sodium or zinc salt.

The copolymers 2c used are preferably copolymers of styrene, (meth) acrylic acid and butyl, preferably n-butyl or t-butyl, esters of (meth) acrylic acid.

As polymers defined under 2d there may be preferably used high molecular weight polybutadienes and polyisoprenes as well as copolymers of butadiene and-/or isoprene with acrylonitrile, in which the proportion of acrylonitrile is preferably from 10 to 30 mol percent.

The high molecular weight organic silicon compounds used are preferably polydimethyl siloxanes having molecular weights of at least 10,000, preferably at least 20,000.

The blends may be prepared by mixing the starting components at temperatures above the melting point of the polyamide used, preferably at temperatures of from 200° to 320° C., in particular from 260° to 290° C.

The usual screw extruders may be used for preparing the moulding compounds according to the invention.

Both single screw and double screw extruders are suitable although double screw extruders are preferred.

Other mixing apparatus suitable for plasticizing synthetic resins may be also used.

Stabilizers, mould release agents, lubricants, crystallization accelerators, plasticizers, pigments, dyes or fillers such as glass fibres or asbestos may be incorporated with the thermoplastic moulding compounds in addition to the polyolefine constituents and the copolymers.

Moulded products produced from the inventive polymer blends are homogeneous and show no tendency to separate into their constituents. They have good surface characteristics and they have less water absorption.

The moulding compositions are particularly suitable for extrusion and injection moulding to produce various shaped products, including pipes with outstanding good mechanical properties.

EXAMPLE 1

88 parts by weight of a 6-polyamide having a relative viscosity of 4.0 determined as described above and a notched impact strength determined according to DIN 53 453 of 3 to 4 kJ/m$^2$, 10 parts by weight of a polyethylene having a melt index of 15 g/10 min. and 2 parts by weight of a copolymer of 59% of styrene, 29% of n-butyl acrylate and 12% of acrylic acid (intrinsic viscosity in tetrahydrofurane: ca. 1.0; acid number: 94) are mixed for 5 minutes in a mixing apparatus. The resulting mixture of components is kneaded and extruded in a 2-shaft extruder of type ZSK 53 operating at 90 revs. per min. at 260° C. and the extruded melt is spun into a water bath, granulated and then dried under vacuum at 80° C. until its water content is reduced to below 0.05% by weight. The product has a relative viscosity (based on the polyamide component) of 4.2 determined on a 1% solution in m-cresol at 25° C. in an Ubbelohde viscosimeter. Alternating bending tests carried out on freshly extruded samples show evidence of good homogeneity and the notched impact strength according to DIN No. 53 453 is found to be 22 kJ/m$^2$.

COMPARISON EXPERIMENT A

In contrast to Example 1, a 6-polyamide which has a relative viscosity of 3.0 measured as defined in Example 1 is used. When the components have been mixed as described in Example 1, they are extruded at 260° C. The product has a relative viscosity of ca. 3.2, determined as in Example 1. Freshly extruded samples show excellent homogeneity in the alternating bending test and have a notched impact strength of 12 kJ/m$^2$ according to DIN No. 53 453.

EXAMPLES 2–4

The results of Examples 2 to 4 carried out as described in Example 1 are summarized in Table 1. Comparison experiments B-E carried out on 6-polyamide as described in comparison experiment A are also set forth in Table 1.

TABLE 1

| Example number | Comparison experiment | Relative viscosity of 6-polyamide η rel | Composition of copolymer used as blend constituent (composition in percent by weight) | percent by weight of the copolymer in the blend | Homogeneity | Notched impact strength kJ/m$^2$ |
|---|---|---|---|---|---|---|
| 2 | | 4.2 | Ethylene/ethyl acrylate (82/18); MI 6–8 | 10% | good | 23 |
| | B | 3.0 | Ethylene/ethyl acrylate (82/18); MI 6–8 | 10% | good | 11.5 |

TABLE 1-continued

| Example number | Comparison experiment | Relative viscosity of 6-polyamide η rel | Composition of copolymer used as blend constituent (composition in percent by weight) | percent by weight of the copolymer in the blend | Homogeneity | Notched impact strength kJ/m² |
|---|---|---|---|---|---|---|
| 3 | | 4.2 | Ethylene/butyl acrylate (85/15); MI 2 | 10% | satisfactory | 22 |
| | C | 3.0 | Ethylene/butyl acrylate (85/15); MI 2 | 10% | satisfactory | 12 |
| 4 | | 4.2 | Ethylene/acrylic acid(92/8) (partly neutralized with $Zn^{2+}$) | 10% | very good | 24 |
| | D | 3.0 | Ethylene/acrylic acid(92/8) (partly neutralized with $Zn^{2+}$) | 10% | very good | 11 |

MI = Melt index

EXAMPLE 5

90 parts by weight of a 6-polyamide having a relative viscosity of 4.2 determined as described above are compounded with 10% by weight of a butadiene/acrylonitrile copolymer (75/25) as described in Example 1. The product is a homogeneous blend having a notched impact strength of 19 kJ/m².

Starting from a 6-polyamide which has a relative viscosity of 3.0, a notched impact strength of 9.5 kJ/m² is obtained when using 10 parts by weight of the same copolymer and of 14 kJ/m² when using 25 parts by weight of said copolymer.

EXAMPLE 6

94 parts by weight of a 6-polyamide having a relative viscosity of 4.2 determined as described above are compounded with 6 parts by weight of a polydimethyl siloxane of molecular weight about 50,000 as described in Example 1. A homogeneous blend having a notched impact strength of 20 kJ/m² is obtained.

Starting from a 6-polyamide having a relative viscosity of 3.0, a homogeneous blend having a notched impact strength of 12 kJ/m² is obtained.

EXAMPLE 7

88 parts by weight of a 6-polyamide having a relative viscosity of 4.2 determined as described above are compounded as described in Example 1 with a silicone granulate (12 parts by weight) consisting of a 50:50 mixture of the polydimethyl siloxane described in Example 6 and aerosil. A homogeneous product which has a notched impact strength of 15 kJ/m² is obtained.

Starting from a 6-polyamide which has a relative viscosity of 3.0, a homogeneous blend having a notched impact strength of 8.5 kJ/m² is obtained.

What we claim is:

1. A high impact polyamide blend consisting of
    (1) from 60 to 95% by weight of a polyamide having a relative viscosity of at least 3.5 determined on a 1% solution of the polyamide in m-cresol at 25° C. and
    (2) from 5 to 40% by weight of at least one polymer selected from the group consisting of
        (a) aliphatic polyolefin having 2 to 4 carbon atoms in the olefin moiety
        (b) olefinic copolymer composed of
            (i) from 65 to 98% by weight of an aliphatic $C_2$ to $C_4$ monoolefin and
            (ii) from 35 to 2% by weight of (meth)acrylic acid or of a (meth)acrylic acid ester having 2 to 10 carbon atoms in the alcohol portion of the ester
        (c) copolymers of
            (I) from 50 to 75% by weight of styrene,
            (II) from 5 to 15% by weight of (meth)acrylic acid and
            (III) from 20 to 30% by weight of a (meth)acrylic acid ester;
        (d) polymers of from 70 to 100% by weight of $C_4$ to $C_5$ aliphatic dienes and from 0 to 30% by weight of acrylonitrile and
        (e) a polydimethyl siloxane having a molecular weight of at least 10,000 with the provisos that the sum of (1)+(2) is equal to 100% by weight of the high impact polyamide blend, that the sum of (i)+(ii) is equal to 100% by weight of (b), that the sum of (I) to (III) is equal to 100% by weight of (c), that the sum of (a) to (e) is equal to 100% by weight of (2) and that component (2a) is invariably used either with component (2b) or (2c).

2. A blend as claimed in claim 1 which consists of from 70 to 90% by weight of polyamide and from 10 to 30% by weight of at least one of components (2).

3. A blend as claimed in claim 1 wherein component (2b) is composed of
    (i) from 75 to 95% by weight of the aliphatic monoolefin and
    (ii) from 25 to 5% by weight of the (meth) acrylic acid or (meth) acrylic acid esters.

4. A blend as claimed in claim 1 wherein component (2) consists of from 99.9 to 75% by weight of aliphatic polyolefins (2a), and of from 0.1 to 25% by weight of the copolymer (2c).

5. A blend as claimed in claim 4, wherein component (2) consists of from 99 to 98% by weight of aliphatic polyolefins (2a) and of from 1 to 2% by weight of the copolymer (2c).

6. A blend as claimed in claim 1, wherein component (2) consists essentially of the olefinic copolymers (2b).

7. A blend as claimed in claim 1 wherein the polyamide is a 6-polyamide.

8. A blend as claimed in claim 1 wherein the polyamide has a relative viscosity of at least 3.8.

9. A blend as claimed in claim 1 wherein component (2a) is a polyethylene or a polyethylene/polypropylene copolymer.

10. A blend as claimed in claim 9 wherein component (2a) is a polyethylene or a polyethylene/polypropylene copolymer which has a melt index of from 5 to 20 cm/10 min (190° C.).

11. A blend as claimed in claim 1 wherein component (2b) is a copolymer of ethylene and (meth) acrylic acid or a (meth) acrylic acid ester which has from 2 to 7 carbon atoms in the alcoholic residue.

12. A blend as claimed in claim 1 wherein component (2e) is a polydimethyl siloxane having a molecular weight of at least 20,000.

13. Moulded products produced from a blend as claimed in claim 1.